US012643749B1

(12) United States Patent
Yang et al.

(10) Patent No.: US 12,643,749 B1
(45) Date of Patent: Jun. 2, 2026

(54) METHOD FOR STACKING, CONTROLLER, AND MATERIAL HANDLING EQUIPMENT

(71) Applicant: VisionNav Robotics USA Inc., Acworth, GA (US)

(72) Inventors: Bingchuan Yang, Acworth, GA (US); Yujie Lu, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/205,881

(22) Filed: May 12, 2025

(51) Int. Cl.
B65G 57/20 (2006.01)
B66F 9/06 (2006.01)
B66F 9/075 (2006.01)

(52) U.S. Cl.
CPC .............. B65G 57/20 (2013.01); B66F 9/063 (2013.01); B66F 9/0755 (2013.01); B65G 2203/0283 (2013.01)

(58) Field of Classification Search
CPC . B65G 57/20; B65G 2203/0283; B66F 9/063; B66F 9/0755
See application file for complete search history.

(56) References Cited

U.S. PATENT DOCUMENTS 4,411,577 A * 10/1983 Shearer, Jr. .......... G05D 1/0244
340/686.2
5,007,783 A * 4/1991 Matsuo ................. B23P 21/004
198/465.1

5,927,937 A * 7/1999 Anderson .............. B65G 61/00
414/792.9
6,275,815 B1 * 8/2001 Schaffer ................. H05K 13/04
706/13
6,567,725 B1 * 5/2003 Wilkey ................ G05B 19/401
414/940
6,652,014 B2 * 11/2003 Schmalz .............. B25J 15/0616
414/737
6,652,217 B2 * 11/2003 Dettman ................ B65G 59/04
271/93
6,675,066 B2 * 1/2004 Moshgbar .......... G05B 19/4189
700/229
6,889,813 B1 * 5/2005 Trammell ......... H01L 21/67706
414/940
8,831,984 B2 * 9/2014 Hoffman ................ G05D 1/644
705/28
9,527,679 B2 * 12/2016 Neiser ................ G05B 19/4189
9,718,661 B1 * 8/2017 Hoffman .............. B62B 5/0076
(Continued)

FOREIGN PATENT DOCUMENTS

CN 115123839 B 12/2022

*Primary Examiner* — Bhavesh V Amin

(74) *Attorney, Agent, or Firm* — Westbridge IP LLC

(57) ABSTRACT

A material handling equipment includes a controller, and the controller is configured to execute program instructions to perform following steps: determining a first carrier and a target storage area of the first carrier, where the target storage area is a top area of a second carrier; determining a deviation storage area based on a first offset and the target storage area, and placing the first carrier in the deviation storage area, where the first offset is greater than or equal to an operational error of the material handling equipment; and moving the first carrier according to a target direction to move the first carrier from the deviation storage area to the target storage area. The technical solutions of the present disclosure may improve an accuracy rate of stacking the carrier.

19 Claims, 6 Drawing Sheets

(56)　　　　References Cited

U.S. PATENT DOCUMENTS

| | | | | |
|---|---|---|---|---|
| 10,186,049 B1* | 1/2019 | Boardman | G06T 7/55 | |
| 10,363,635 B2* | 7/2019 | Claretti | B65G 1/1378 | |
| 10,643,294 B2* | 5/2020 | Murphy | B65G 1/137 | |
| 10,894,676 B2* | 1/2021 | Turpin | B65G 59/02 | |
| 11,407,107 B2* | 8/2022 | Neville | B25J 9/1687 | |
| 11,577,858 B2* | 2/2023 | Cottle | B65G 43/08 | |
| 11,655,100 B2* | 5/2023 | Scarth | B65G 1/0485 | |
| | | | | 414/277 |
| 11,738,456 B2* | 8/2023 | Neville | B65G 61/00 | |
| | | | | 700/245 |
| 11,905,115 B2* | 2/2024 | Sun | B07C 5/3412 | |
| 12,240,122 B2* | 3/2025 | Neville | B65G 57/08 | |
| 2002/0090282 A1* | 7/2002 | Bachrach | H10P 72/3218 | |
| | | | | 414/271 |
| 2003/0120387 A1* | 6/2003 | Sherwin | B25J 15/0052 | |
| | | | | 294/2 |
| 2004/0062633 A1* | 4/2004 | Rice | H10P 72/0612 | |
| | | | | 198/475.1 |
| 2006/0082172 A1* | 4/2006 | Clark | B25J 15/0616 | |
| | | | | 414/752.1 |
| 2006/0133917 A1* | 6/2006 | Clark | B25J 15/0052 | |
| | | | | 414/729 |
| 2007/0280812 A1* | 12/2007 | Morency | B65G 61/00 | |
| | | | | 414/729 |
| 2011/0118869 A1* | 5/2011 | Smith | G06Q 10/08 | |
| | | | | 700/218 |
| 2012/0039696 A1* | 2/2012 | Brooks | B66F 17/003 | |
| | | | | 701/50 |
| 2013/0103552 A1* | 4/2013 | Hoffman | G06Q 10/047 | |
| | | | | 705/28 |
| 2014/0205403 A1* | 7/2014 | Criswell | B65G 67/24 | |
| | | | | 414/809 |
| 2014/0241837 A1* | 8/2014 | Bartelet | B64F 1/366 | |
| | | | | 414/277 |
| 2015/0274447 A1* | 10/2015 | McCollum | B65G 57/03 | |
| | | | | 414/796.2 |
| 2016/0016311 A1* | 1/2016 | Konolige | B25J 9/1664 | |
| | | | | 901/30 |
| 2016/0129592 A1* | 5/2016 | Saboo | B25J 19/021 | |
| | | | | 700/248 |
| 2016/0136808 A1* | 5/2016 | Konolige | B25J 9/1612 | |
| | | | | 700/214 |
| 2016/0244184 A1* | 8/2016 | Alderman | G05D 1/0274 | |
| 2016/0297655 A1* | 10/2016 | Weiss | B62B 3/0618 | |
| 2016/0327951 A1* | 11/2016 | Walton | G05D 1/646 | |
| 2017/0200248 A1* | 7/2017 | Murphy | G06Q 10/08 | |
| 2017/0374511 A1* | 12/2017 | Buchmann | H04W 4/021 | |
| 2018/0009643 A1* | 1/2018 | Hoffman | B66F 9/24 | |
| 2018/0354121 A1* | 12/2018 | Sezaki | B25J 15/0616 | |
| 2019/0337733 A1* | 11/2019 | Wehner | B65G 47/90 | |
| 2019/0375602 A1* | 12/2019 | Katagiri | B65G 47/1492 | |
| 2020/0002143 A1* | 1/2020 | Hasegawa | G05D 1/021 | |
| 2020/0249692 A1* | 8/2020 | Thode | G05D 1/0246 | |
| 2020/0306964 A1* | 10/2020 | Neville | B25J 9/1661 | |
| 2021/0023717 A1* | 1/2021 | Yu | G06V 20/58 | |
| 2021/0035056 A1* | 2/2021 | Jacobus | G05D 1/246 | |
| 2021/0309501 A1* | 10/2021 | Takao | B66F 9/07581 | |
| 2021/0326800 A1* | 10/2021 | Jacobus | G05D 1/0246 | |
| 2021/0387808 A1* | 12/2021 | Kalouche | G06Q 10/083 | |
| 2021/0395007 A1* | 12/2021 | Galluzzo | B65G 1/1371 | |
| 2021/0402595 A1* | 12/2021 | Beinhofer | G05B 19/4183 | |
| 2022/0189055 A1* | 6/2022 | Kita | G06V 20/56 | |
| 2022/0250863 A1* | 8/2022 | Myers | B65H 3/32 | |
| 2022/0297305 A1* | 9/2022 | Yu | G06V 20/52 | |
| 2022/0347845 A1* | 11/2022 | Neville | B25J 9/1697 | |
| 2022/0375206 A1* | 11/2022 | Onoda | B66F 9/142 | |
| 2023/0092900 A1* | 3/2023 | Lovett | B25J 9/1035 | |
| | | | | 700/245 |
| 2023/0211950 A1* | 7/2023 | Nakagawa | B23Q 1/4866 | |
| | | | | 700/112 |
| 2023/0219237 A1* | 7/2023 | Galluzzo | B25J 19/023 | |
| | | | | 700/245 |
| 2023/0268212 A1* | 8/2023 | Lin | H01L 21/67733 | |
| | | | | 414/267 |
| 2023/0347513 A1* | 11/2023 | Neville | B65G 57/08 | |
| 2024/0061428 A1* | 2/2024 | Perkins | B25J 9/1676 | |
| 2024/0262627 A1* | 8/2024 | Mohanarajah | G06Q 10/087 | |
| 2024/0409315 A1* | 12/2024 | Li | G06Q 10/08 | |
| 2025/0206525 A1* | 6/2025 | Lindbo | B65G 1/0464 | |

* cited by examiner

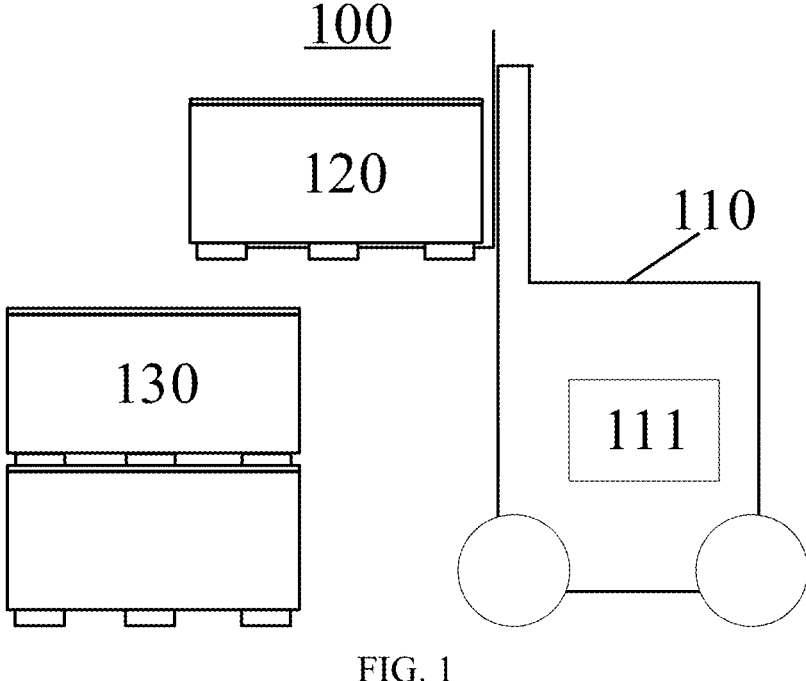

FIG. 1

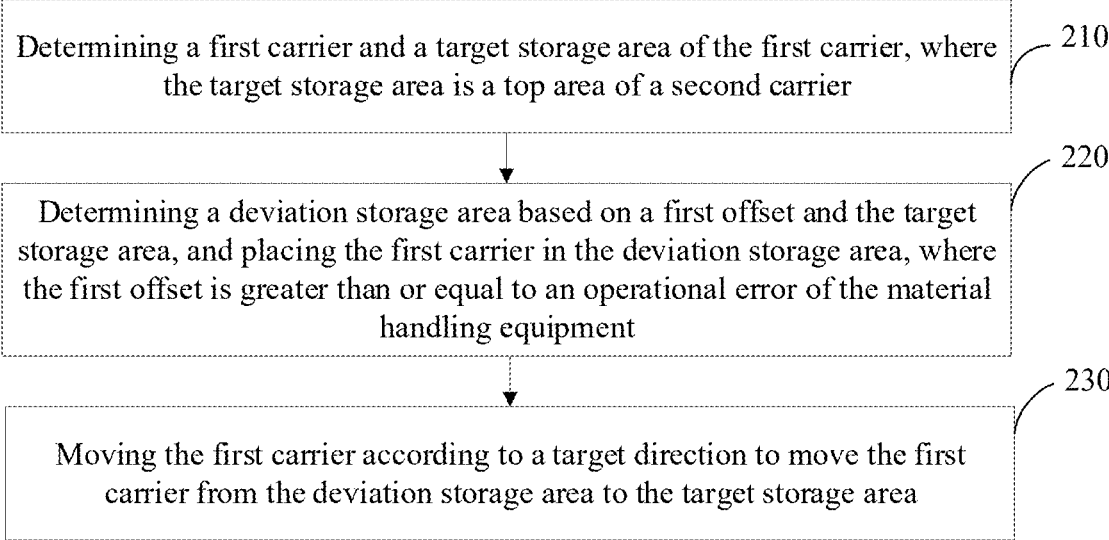

Determining a first carrier and a target storage area of the first carrier, where the target storage area is a top area of a second carrier                                    210

Determining a deviation storage area based on a first offset and the target storage area, and placing the first carrier in the deviation storage area, where the first offset is greater than or equal to an operational error of the material handling equipment                                    220

Moving the first carrier according to a target direction to move the first carrier from the deviation storage area to the target storage area                                    230

FIG. 2

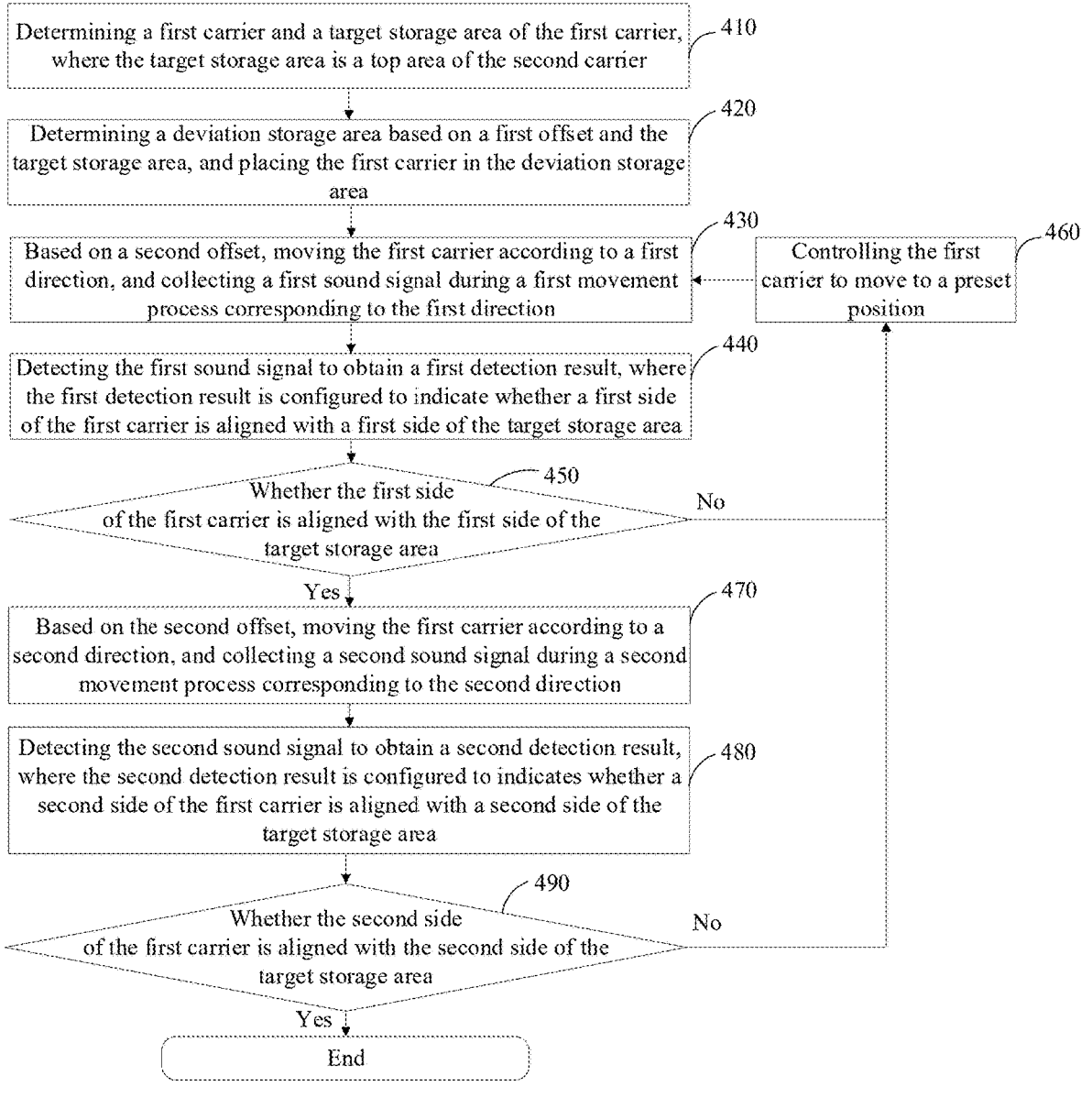

Determining a first carrier and a target storage area of the first carrier, where the target storage area is a top area of the second carrier ⌐410

Determining a deviation storage area based on a first offset and the target storage area, and placing the first carrier in the deviation storage area ⌐420

Based on a second offset, moving the first carrier according to a first direction, and collecting a first sound signal during a first movement process corresponding to the first direction ⌐430

Controlling the first carrier to move to a preset position ⌐460

Detecting the first sound signal to obtain a first detection result, where the first detection result is configured to indicate whether a first side of the first carrier is aligned with a first side of the target storage area ⌐440

Whether the first side of the first carrier is aligned with the first side of the target storage area ⌐450          No Yes Based on the second offset, moving the first carrier according to a second direction, and collecting a second sound signal during a second movement process corresponding to the second direction ⌐470

Detecting the second sound signal to obtain a second detection result, where the second detection result is configured to indicates whether a second side of the first carrier is aligned with a second side of the target storage area ⌐480

Whether the second side of the first carrier is aligned with the second side of the target storage area ⌐490          No Yes End

FIG. 4

METHOD FOR STACKING, CONTROLLER, AND MATERIAL HANDLING EQUIPMENT

TECHNICAL FIELD

The present disclosure relates to the field of logistics application technologies, specifically to a method for stacking, a controller, and a material handling equipment.

BACKGROUND

Currently, the application of warehousing and logistics technologies in people's lives is becoming increasingly widespread. With the rapid development of the logistics industry, the demand for warehousing of goods is also increasing. How to store as many goods as possible in a limited space is one of problems that need to be solved at present.

To solve the above problem, one of technologies that can be adopted is to use a material handling equipment to stack a carrier containing goods. However, during a stacking process, factors such as the limited control precision of the material handling equipment itself often result in a low stacking accuracy rate.

SUMMARY

In a first aspect, an embodiment of the present disclosure provides a material handling equipment, including a controller, and the controller is configured to execute program instructions to perform following steps: determining a first carrier and a target storage area of the first carrier, where the target storage area is a top area of a second carrier; determining a deviation storage area based on a first offset and the target storage area, and placing the first carrier in the deviation storage area, where the first offset is greater than or equal to an operational error of the material handling equipment; and moving the first carrier according to a target direction to move the first carrier from the deviation storage area to the target storage area.

In a second aspect, an embodiment of the present disclosure provides a method for stacking, and the method for stacking includes: determining a first carrier and a target storage area of the first carrier, where the target storage area is a top area of a second carrier; determining a deviation storage area based on a first offset and the target storage area, and placing the first carrier in the deviation storage area, where the first offset is greater than or equal to an operational error of a material handling equipment; and moving the first carrier according to a target direction to move the first carrier from the deviation storage area to the target storage area.

In a third aspect, an embodiment of the present disclosure provides a controller, and the controller includes: a processor; and a memory configured to store an instruction executable by the processor, where the processor is configured to execute a method for stacking, and the method for stacking includes: determining a first carrier and a target storage area of the first carrier, where the target storage area is a top area of a second carrier; determining a deviation storage area based on a first offset and the target storage area, and placing the first carrier in the deviation storage area, where the first offset is greater than or equal to an operational error of a material handling equipment; and moving the first carrier according to a target direction to move the first carrier from the deviation storage area to the target storage area.

BRIEF DESCRIPTION OF THE DRAWINGS

FIG. 1 is a schematic diagram of a system architecture of a material handling system according to an exemplary embodiment of the present disclosure.

FIG. 2 is a schematic flowchart illustrating a method for stacking according to an exemplary embodiment of the present disclosure.

FIG. 4 is a schematic flowchart illustrating a method for stacking according to an exemplary embodiment of the present disclosure.

DETAILED DESCRIPTION OF THE EMBODIMENTS

Figure 3A:
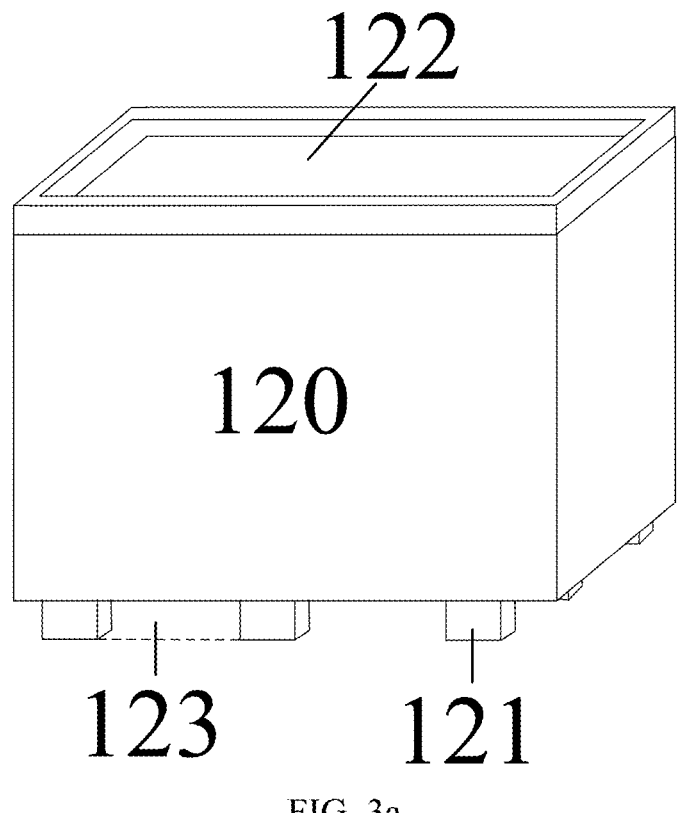
FIG. 3a is a schematic diagram of a movable carrier according to an embodiment of the present disclosure.

The following clearly and completely describes the technical solutions in the embodiments of the present disclosure with reference to the accompanying drawings in the embodiments of the present disclosure. Obviously, the described embodiments are a portion of the embodiments of the present disclosure and not all of the embodiments. All other embodiments obtained by a person of ordinary skill in the art based on the embodiments of the present disclosure fall within the protection scope of the present disclosure.

In order to facilitate understanding of the technical solutions of the present disclosure, explanations of relevant terms in the specification are provided first in the following.

Processor: it is responsible for executing core functions such as calculation, control and decision-making. It may receive data from a sensor, run control algorithms, and command an actuator to complete a task. Common processor types may include: a central processing unit (CPU), a digital signal processor (DSP), a microcontroller unit (MCU), and so on. The processor in the specification may refer to a collection of processors for performing the same or different tasks.

Memory: it is configured to store data or a program. A memory in the specification may be referred to as a collection of memories for performing the same or different tasks.

Controller: at the hardware level, the controller generally includes a processor and a memory. Optionally, the controller may also include input and output interfaces, a mainboard, peripheral circuits and elements. At the software level, the controller generally includes a control algorithm, an operating system, a communication protocol, and so on. A controller in the specification may be referred to as a collection of controllers for performing the same or different tasks.

Control system: it is an integrated software and hardware collection used to ensure that a material handling equipment (e.g., a robot) performs tasks according to predetermined goals or strategies, which may include a controller, a sensor, and an actuator. Optionally, the control system may also include peripheral circuits, wiring harnesses, and the like.

Material handling equipment: it refers to a device that may automatically or semi-automatically perform a handling task. Common forms of the material handling equipment include a forklift, an automated guided vehicle (AGV), an autonomous mobile robot (AMR), a humanoid robot, a robotic arm, and the like.

Automated guided forklift (AGF): it is an intelligent industrial vehicle that integrates a forklift technology and an automated guided vehicle (AGV) technology. It can automatically complete tasks such as material handling and stacking.

Stacking refers to arranging and piling up some objects vertically according to a specific rule.

A stacking object refers to an object involved in stacking, and specifically may be goods itself or goods with a simple package such as a wrapping film, or may be a container that can hold and carry goods, for example, a material cage, a wooden box, a plastic box, or a pallet, etc.

A stacking process refers to a process in which a material handling equipment lifts a first stacking object to make the first stacking object move close to a second stacking object, and then adjusts a pose of the material handling equipment to align the first stacking object with the second stacking object, and thus places the first stacking object on the second stacking object, so as to complete stacking. Here, the first stacking object refers to the stacking object located above. The second stacking object refers to the stacking object located below.

A stacking state refers to the relative position state of two stacking objects in a stacking process.

Alignment means a state in which two or more stacking objects are arranged in a vertical direction, and at least part of border lines of a stacking object is parallel to or over-lapped with at least part of border lines of another stacking object. The vertical direction refers to a Z-axis direction (i.e., a height direction of the material handling equipment 110) in a coordinate system of a material handling equipment.

The embodiments of the present disclosure provides a material handling equipment, by determining a first carrier and a target storage area of the first carrier, determining a deviation storage area with a deviation of a first offset from the target storage area according to the first offset and the target storage area, placing the first carrier in the deviation storage area, and finally moving the first carrier according to a target direction, the first carrier moves from the deviation storage area to the target storage area, where the target storage area is a top area of a second carrier, and the first offset is greater than or equal to an operational error of the material handling equipment. With this setup, by intentionally placing the first carrier in a deviation storage area first, and then finely adjusting the first carrier to move to the target storage area, the first carrier may be accurately stacked on the second carrier under a condition that the control precision of the material handling equipment is limited, reducing requirements for the material handling equipment while improving stacking precision.

Exemplary System

FIG. 1 is a schematic diagram of a system architecture of a material handling system according to an exemplary embodiment of the present disclosure. As shown in FIG. 1, the material handling system 100 may include a material handling equipment 110, a first carrier 120, and a second carrier 130. The material handling equipment 110 may be an automated guided forklift, an automated guided vehicle, etc., and the material handling equipment 110 is configured to stack the first carrier 120 on the second carrier 130.

The first carrier 120 and the second carrier 130 are similar, both are carriers used for storing goods, and the carrier may be a pallet, a material cage, a pallet box, a cargo container, etc.

The material handling equipment 110 may be equipped with a controller 111, and the controller 111 may be configured to control the material handling equipment to execute a method for stacking according to the embodiments of the present disclosure. Optionally, the controller 111 may be located outside the material handling equipment 110, for example, the controller 111 is located in a device independent of the material handling equipment 110. Exemplarily, the controller 111 may include at least one of a logic controller, a machine vision controller, a motion controller, etc.

In an application scenario example, the controller 111 may determine the first carrier 120 and a target storage area of the first carrier 120, and this target storage area is a top area of the second carrier 130. After that, the controller 111 may determine a deviation storage area based on a first offset and the target storage area, and place the first carrier 120 in the deviation storage area. Finally, the material handling equipment may adjust a position of the first carrier 120 according to a target direction, to move the first carrier 120 from the deviation storage area directly to be above the second carrier 130, that is, to stack the first carrier 120 on the second carrier 130.

It should be understood that the above application scenario example is only shown to facilitate the understanding of the spirit and principle of the present disclosure, and the embodiments of the present disclosure are not limited thereto. On the contrary, the embodiments of the present disclosure may be applied to any scenario where they are applicable.

Exemplary Method

FIG. 2 is a schematic a flowchart illustrating a method for stacking according to an exemplary embodiment of the present disclosure. The method of FIG. 2 may be executed by the material handling equipment 110 in FIG. 1. As shown in FIG. 2, this method for stacking may include the following contents.

210: determining a first carrier and a target storage area of the first carrier, where the target storage area is a top area of a second carrier.

Specifically, the first carrier 120 and the second carrier 130 are both carriers used for storing goods, the carrier may be moved through the material handling equipment 110, and the carrier may be at least one of a material cage, a pallet box, a pallet, a cargo container, or other container.

The method for stacking provided in the present disclosure is applied to a scenario of stacking one carrier on another carrier. Therefore, the target storage area of the first carrier 120 may be a top area of the second carrier 130. During the process of stacking the first carrier 120 on the second carrier 130, the first carrier 120 may contain target goods or may not contain target goods.

In an example, the material handling equipment 110 may receive a stacking instruction sent by other devices, and the stacking instruction may include an identifier of the first carrier 120 and an identifier of the target storage area. The material handling equipment 110 may determine the first carrier 120 based on the identifier of the first carrier 120, and carry the first carrier 120 to move near the target storage area.

In an example, the material handling equipment 110 may move to a preset pickup location, move the first carrier 120 onto the material handling equipment 110 at the pickup location, and receive a stacking instruction, where the stacking instruction may include the identifier of the target storage area. After that, the material handling equipment 110 may carry the first carrier 120 to move near the target storage area based on the identifier of the target storage area. In an example, the position of the target storage area may be obtained based on the identifier of the target storage area. Similarly, the position of the first carrier 120 may be obtained based on the identifier of the first carrier 120. In an example, the material handling equipment 110 may move back to the pickup location after completing a current stacking task or a current handling task, to carry another carrier and execute a stacking process of the carrier.

In an example, the identifier of the target storage area may be an identifier of the second carrier 130, that is, the material handling equipment 110 may query the position of the second carrier 130 based on the identifier of the second carrier 130, and determine the target storage area based on the position of the second carrier 130.

In an example, an area near the target storage area may be a placement location corresponding to the target storage area. The placement location is the location where the material handling equipment 110 is located when the material handling equipment 110 places the first carrier 120 on the second carrier 130. At the placement location, the first carrier 120 may be aligned with the target storage area through the lift and movement of the material handling equipment 110.

220: determining a deviation storage area based on a first offset and the target storage area, and placing the first carrier in the deviation storage area, where the first offset is greater than or equal to an operational error of the material handling equipment.

In an example, the operational error of the material handling equipment 110 may include an error caused by the control precision of the material handling equipment 110 itself, which may cause a deviation between an actual placement position and a desired placement position of the first carrier 120. In an example, the control precision of the material handling equipment 110 itself may be affected by factors such as precision limitations of a mechanical structure of the material handling equipment 110, a measurement error of a sensor on the material handling equipment 110, and interference from environmental factors during a handling process.

In an example, the operational error of the material handling equipment 110 includes at least one of a position deviation and an angular deviation.

In an example, when the first offset is greater than or equal to the operational error of the material handling equipment 110, since the first offset is large enough, it may be outside a distribution range of the operational error. Therefore, when the material handling equipment 110 places the first carrier 120 in the deviation storage area, the actual placement position of the first carrier 120 and the target storage area may not overlap.

230: moving the first carrier according to a target direction to move the first carrier from the deviation storage area to the target storage area.

Specifically, after placing the first carrier 120 in the deviation storage area, the material handling equipment 110 may move the first carrier 120 slowly according to the predetermined target direction through more precise control and adjustment, so that the first carrier 120 may accurately reach the target storage area.

In an example, the target direction may be a direction that the first carrier 120 needs to move when moving the first carrier 120 from the deviation storage area to the target storage area.

In an example, the target direction may be determined based on a relative positional relationship between the deviation storage area and the target storage area.

The embodiments of the present disclosure provide a method for stacking, which adopts a two-stage operation method to stack the first carrier on the second carrier. In the first stage, the first carrier is placed on the deviation storage area, which is mainly to reduce the requirement for an initial placement precision of the material handling equipment. Since the first offset is greater than or equal to the operational error, even if there is a specific operational error in the material handling equipment, the first carrier may not be directly placed in the target storage area. In the second stage, the first carrier is moved according to the target direction so as to achieve a precise stacking operation. After placing the first carrier in the deviation storage area, the material handling equipment may move the first carrier according to the predetermined target direction through more precise control and adjustment, so that the first carrier may accurately reach the target storage area. This method for stacking may overcome the influence of the operational error on the stacking process to some extent, improving the accuracy rate of stacking the carrier, that is, increasing an alignment degree of the carrier.

According to an embodiment of the present disclosure, after the first carrier 120 has been placed in the deviation storage area, and the first carrier 120 and the second carrier 130 have already been in contact with each other. In this case, when the material handling equipment 110 moves the first carrier 120 according to the target direction, causing relative movement between the first carrier 120 and the second carrier 130, the relative friction between the first carrier 120 and the second carrier 130 may result in a specific sound signal. These sound signal may be configured to indicate a movement state of the first carrier 120 and its interaction with surrounding objects. Therefore, step 230 may include: moving the first carrier according to the target direction, and collecting a sound signal during a movement process of the first carrier; and detecting the sound signal to obtain a detection result, where the detection result is configured to indicate whether the first carrier is moved to the target storage area.

Specifically, the material handling equipment 110 may be provided with a sound sensor, and taking the material handling equipment 110 as an automated guided forklift as an example, the sound sensor may be set on a fork of the material handling equipment 110 to accurately capture the sound signal related to the movement of the first carrier 120. Of course, the sound sensor may be set at other positions on the material handling equipment 110.

In an example, after collecting the sound signal, the sound signal may be detected to obtain the detection result.

In an example, the controller 111 of the material handling equipment 110 may perform feature extraction on the collected sound signal, and compare an extracted feature vector with each template vector in a preset feature template to obtain the detection result based on the similarity between the feature vector and each template vector.

In an example, each template vector in the feature template may be used to indicate the sound signals generated by the first carrier 120 in different states, such as a sound signal when the first carrier 120 is not moved to the target storage area, a sound signal when the first carrier 120 approaches the target storage area, a sound signal when the first carrier 120 moves to the target storage area, etc.

In an example, a sound detection model may be pre-trained based on the sound signals of the first carrier 120 in different states. The material handling equipment 110 may input the sound signal into the sound detection model after collecting the sound signal, to obtain the detection result output by the sound detection model. The detection result is configured to indicate whether the first carrier 120 has been moved to the target storage area.

In an example, when the detection result indicates that the first carrier 120 has reached the target storage area, the controller 111 of the material handling equipment 110 may issue a command to stop the movement of the first carrier 120 and perform subsequent fixing and locking operations to ensure that the first carrier 120 is stably stacked on the target storage area. If the detection result shows that the first carrier 120 has not yet reached the target storage area, the material handling equipment 110 may continue to move the first carrier 120 according to the target direction, and continuously collect and detect the sound signal until the detection result indicates that the first carrier 120 has reached the target storage area.

In this embodiment of the present disclosure, by collecting and detecting the sound signal during the movement process of the first carrier 120, it is possible to judge in real time and accurately whether the first carrier 120 has been moved to the target storage area with a high accuracy rate, improving the accuracy of stacking.

According to an embodiment of the present disclosure, the material handling equipment 110 still has an operational error in a process of placing the first carrier 120 in the deviation storage area, or there is also an operational error in a process of controlling the first carrier 120 to move towards a direction to shorten the first offset. Therefore, when moving the first carrier 120 according to the target direction, a movement range of the first carrier 120 may be further increased based on the first offset. Therefore, step 230 may include: moving the first carrier according to the target direction based on a second offset to move the first carrier from the deviation storage area to the target storage area, where the second offset is greater than the first offset.

In an example, the material handling equipment 110 may use the second offset as the maximum distance that the first carrier 120 may move. Therefore, the material handling equipment 110 may move the first carrier 120 according to the target direction to move the first carrier 120 from the deviation storage area to the target storage area. During the movement process, the material handling equipment 110 may monitor the position of the first carrier 120 in real time to ensure that its moving distance does not exceed the second offset.

In an example, during the movement process, if the material handling equipment 110 determines that the first carrier 120 has been moved to the target storage area, then the material handling equipment 110 may stop moving the first carrier 120 and determine that the stacking of the first carrier 120 is completed. In an example, if the moving distance of the first carrier 120 has reached the second offset, but the material handling equipment 110 still determines that the first carrier 120 has not been moved to the target storage area, then the material handling equipment 110 may stop moving the first carrier 120 and determine the failure of stacking of the first carrier 120.

In an example, the material handling equipment 110 may collect the sound signal during the movement process and judge whether the first carrier 120 has been moved to the target storage area according to the sound signal. Alternatively, the material handling equipment may also use visual recognition to judge whether the first carrier 120 and the target storage area coincide, or may judge whether the distance between the first carrier 120 and the target storage area is less than a preset distance threshold through a laser, and so on, to judge whether the first carrier 120 has been moved to the target storage area.

In this embodiment of the present disclosure, introducing the second offset as the upper limit of the moving distance of the first carrier 120 may effectively avoid the risk of the failure of stacking caused by the accumulation of the operational error and improve the success rate of stacking.

According to an embodiment of the present disclosure, the target direction includes a first direction and a second direction, and step 230 includes: moving the first carrier according to the first direction to align a first side of the first carrier with a first side of the target storage area; and moving the first carrier according to the second direction to align a second side of the first carrier with a second side of the target storage area.

In an example, both the first side and the second side are defined reference edges for accurately positioning the first carrier 120 and the target storage area. In an example, for the first carrier 120, each of the first side and the second side may be a projection of a side surface of the first carrier 120 in the vertical direction, or the first side and the second side may be the edges of a bottom surface of the first carrier 120, and the bottom surface of the first carrier 120 corresponds to the target storage area. For example, the first side and the second side are two mutually perpendicular edges of the bottom surface of the first carrier 120. Similarly, for the target storage area, the first side and the second side may be two mutually perpendicular edges on the contour of the target storage area, the first side of the first carrier 120 corresponds to the first side of the target storage area, and the second side of the first carrier 120 corresponds to the second side of the target storage area. Taking the bottom surface of the first carrier 120 and the target storage area as rectangles as an example, the long side of the rectangle may be defined as the first side, and the short side perpendicular to the long side may be defined as the second side.

In an example, when moving the first carrier 120 according to the first direction, the material handling equipment 110 may obtain the position information of the first carrier 120 and the target storage area in real time, and then, according to the position information of the first carrier 120 and the target storage area, the material handling equipment 110 may calculate a position deviation of the first carrier 120 compared to the target storage area in the first direction, and adjust a moving speed and/or moving distance of the first carrier 120 according to the position deviation, until the first side of the first carrier 120 is aligned with the first side of the target storage area.

In an example, when moving the first carrier 120 according to the first direction, the material handling equipment 110 may obtain the sound signal in real time, and judge whether the first carrier 120 has been placed in the target storage area in the first direction according to the detection result of the sound signal. If the judgment result is yes, it is considered that the first side of the first carrier 120 has been aligned with the first side of the target storage area.

In an example, when moving the first carrier 120 according to the second direction, the material handling equipment 110 may also obtain the position information of the first carrier 120 and the target storage area in real time, then determine a position deviation of the first carrier 120 compared to the target storage area in the second direction, and finally adjust a moving speed and/or moving distance of the first carrier 120 in the second direction according to the position deviation, until the second side of the first carrier 120 is aligned with the second side of the target storage area.

In an example, when moving the first carrier 120 according to the second direction, the material handling equipment 110 may also obtain the sound signal in real time, and judge whether the first carrier 120 has been placed in the target storage area in the second direction according to the detection result of the sound signal. If the judgment result is yes, it is considered that the second side of the first carrier 120 has been aligned with the second side of the target storage area.

In this embodiment of the present disclosure, moving the first carrier 120 according to the first direction and the second direction respectively, and performing align/alignment operations on the two side of the first carrier 120 respectively, may further improve the positioning accuracy of the first carrier 120, thereby ensuring the accuracy of a stacking operation.

According to an embodiment of the present disclosure, step 230 includes: moving the first carrier according to the first direction, and collecting a first sound signal during a first movement process corresponding to the first direction; detecting the first sound signal to obtain a first detection result, where the first detection result is configured to indicate whether the first side of the first carrier is aligned with the first side of the target storage area; moving the first carrier according to the second direction, and collecting a second sound signal during a second movement process corresponding to the second direction; and detecting the second sound signal to obtain a second detection result, where the second detection result is configured to indicate whether the second side of the first carrier is aligned with the second side of the target storage area.

Specifically, the material handling equipment 110 may be provided with a sound sensor, which may be a microphone.

When moving the first carrier 120 according to the first direction, the sound sensor set on the material handling equipment 110 may collect the first sound signal in real time and detect the first sound signal to obtain the first detection result. The first detection result is configured to indicate whether the first carrier 120 has been moved to the target storage area in the first direction, that is, whether the first side of the first carrier 120 is aligned with the first side of the target storage area. In an example, the direction where the first side is located may be perpendicular to the first direction. In other examples, the direction where the first side is located may not be perpendicular to the first direction.

In an example, the first sound signal may include friction sounds between a bottom of the first carrier 120 and a top of the second carrier 130, a sound of air flow around the first carrier 120, and collision sounds that may occur when the first carrier 120 moves to the target storage area in the first direction.

Similarly, when moving the first carrier 120 according to the second direction, the material handling equipment 110 may collect the second sound signal in real time to obtain the second detection result. Here, the second detection result is configured to indicate whether the first carrier 120 has been moved to the target storage area in the second direction, that is, whether the second side of the first carrier 120 is aligned with the second side of the target storage area. Here, the direction where the second side is located is perpendicular to the second direction. In other examples, the direction where the second side is located may not be perpendicular to the second direction.

In this embodiment of the present disclosure, it is not necessary to determine a difference between the first carrier 120 and the target storage area through optical or mechanical positioning devices, but rather to judge whether the first carrier 120 has been moved to a target position through the sound signal, achieving precise determination of whether the first carrier 120 has been moved to a corresponding target position in the first direction or the second direction, and improving the accuracy of the material handling equipment 110 when performing a stacking task. The target position here may be a position of the first carrier 120 when the first side of the first carrier 120 is aligned with the first side of the target storage area, or a position of the first carrier 120 when the second side of the first carrier 120 is aligned with the second side of the target storage area.

According to an embodiment of the present disclosure, moving the first carrier according to the first direction, and collecting the first sound signal during the first movement process corresponding to the first direction may include: moving the first carrier according to the first direction based on a second offset, and collecting the first sound signal during the first movement process corresponding to the first direction, where the second offset is greater than the first offset. Moving the first carrier according to the second direction, and collecting the second sound signal during the second movement process corresponding to the second direction may include: moving the first carrier according to the second direction based on the second offset, and collecting the second sound signal during the second movement process corresponding to the second direction.

As mentioned earlier, setting the first offset is to allow the first carrier 120 to first move away from the target storage area by a sufficient distance. Setting the second offset takes into account that the material handling equipment 110 may still encounter an operational error when placing the first carrier 120 in the deviation storage area, or that there may also be an operational error when controlling the first carrier 120 to move towards the direction to shorten the first offset, so the second offset may be greater than the first offset.

In an example, taking the first direction as a rightward direction (or a leftward direction) and the second direction as a backward direction (or a forward direction) as an example, the first offset may be 3 centimeters, which may be used to indicate that a distance between the deviation storage area and the target storage area in the left and right direction is 3 centimeters, and the distance between the deviation storage area and the target storage area in the front and back direction is 3 centimeters. Specifically, the deviation storage area is located 3 centimeters to the left and 3 centimeters in front of the target storage area. The second offset may be 5 centimeters. Specifically, in the left and right direction, the material handling equipment 110 may move the first carrier 120 rightward by up to 5 centimeters, and in the front and back direction, the material handling equipment 110 may move the first carrier 120 backward by up to 5 centimeters. In the left and right direction, a direction corresponding to the second offset and a direction corresponding to the first offset are opposite, similarly, in the front and back direction, a direction corresponding to the second offset and a direction corresponding to the first offset are opposite. In an example, numerical values corresponding to the second offset of the first direction and the second offset of the second direction may be the same or different.

In an example, when moving the first carrier 120 from the deviation storage area to the target storage area, the material handling equipment 110 may first move the first carrier 120 according to the first direction based on the second offset. During the first movement process, the sound sensor installed on the material handling equipment 110 may collect the first sound signal in real time and perform real-time analysis on the first sound signal to obtain the first detection result. The first detection result may indicate whether the first side of the first carrier 120 is aligned with the first side of the target storage area. If the first detection result indicates that both are not aligned with each other, the material handling equipment 110 may continue to fine-tune the position of the first carrier 120 within the range not exceeding the second offset until the first side is aligned.

In an example, after the first side of the first carrier 120 is aligned with the first side of the target storage area, the material handling equipment 110 may move the first carrier 120 according to the second direction based on the second offset. Similarly, during the second movement process, the second sound signal is collected to obtain the second detection result. The second detection result is configured to indicate whether the second side of the first carrier 120 is aligned with the second side of the target storage area. If they are not aligned with each other, the material handling equipment 110 may continuously adjust the position of the first carrier 120 within the limit of the second offset until the second side is also accurately aligned with the second side of the target storage area.

In this embodiment of the present disclosure, by setting the first offset and the second offset, and combining the first sound signal during the first movement process and the second sound signal during the second movement process, the material handling equipment 110 may move the first carrier 120 from the deviation storage area to the target storage area more accurately in the presence of operational error, greatly improving the accuracy and reliability of stacking the carrier and effectively enhancing the working efficiency of the entire material handling system or the stacking system.

According to an embodiment of the present disclosure, the first direction is perpendicular to the second direction.

In an example, without considering the height, successfully stacking the first carrier 120 on the second carrier 130 means that a position of the first carrier 120 in a horizontal direction is consistent or nearly consistent with a position of the second carrier 130 in the horizontal direction, that is, a projection of the first carrier 120 in a vertical direction needs to coincide or nearly coincide with a projection of the second carrier 130 in the vertical direction. To achieve the successful stacking of the first carrier 120 on the second carrier 130, the present disclosure proposes performing alignment operations on two mutually perpendicular directions respectively. Two mutually perpendicular directions may form a two-dimensional plane coordinate system. In the plane coordinate system, the position of the first carrier 120 on the two-dimensional plane is precisely adjusted independently according to the two mutually perpendicular directions, ensuring the precision of stacking.

According to an embodiment of the present disclosure, the first offset is greater than or equal to a sum of the operational error of the material handling equipment 110 and a dimensional error between the first carrier 120 and the second carrier 130.

In an example, the dimensional error between the first carrier 120 and the second carrier 130 may be configured to indicate a difference in size between the cooperating parts on the first carrier 120 and the second carrier 130 after the success of stacking. For example, as shown in FIG. 3e, the first carrier 120 is used for stacking on the second carrier 130, the bottom of the first carrier 120 may be provided with a protruding component 121, and the top of the second carrier 130 may be provided with a slot 132. When the first carrier 120 is successfully stacked on the second carrier 130, the protruding component 121 at the bottom of the first carrier 120 may be engaged with the slot 132 at the top of the second carrier 130. A difference between a width of the protruding component 121 at the bottom of the first carrier 120 and a width of the slot 132 at the top of the second carrier 130 may be the dimensional error between the first carrier 120 and the second carrier 130. For example, if a design width of the slot 132 is 100 millimeters, and a design width of the protruding component 121 is 98 millimeters, then the dimensional error in the width direction is 2 millimeters.

In an example, as mentioned above, the purpose of setting the first offset is to ensure that in various possible error scenarios, each time stacking the first carrier 120, the first carrier 120 may be placed in the deviation storage area first; or, each time stacking the first carrier 120, the first carrier 120 may not completely fall into the target storage area first, that is, it may not accidentally fall into the target storage area with a very small probability due to the accumulation of errors. As such, the method for stacking of the present disclosure may be used for large-scale stacking tasks, ensuring that any stacking task is controllable and achieving the successful execution of stacking tasks. Therefore, the first offset may be set to be greater than or equal to the sum of the operational error of the material handling equipment 110 and the dimensional error between the first carrier 120 and the second carrier 130.

In this embodiment of the present disclosure, the first offset is greater than or equal to the sum of the operational error of the material handling equipment 110 and the dimensional error between the first carrier 120 and the second carrier 130, which ensures that the first carrier 120 is first placed in an area (such as the deviation storage area) deviated from the target storage area, thereby laying the foundation for the subsequent operation of successfully stacking the first carrier 120 onto the target storage area of the second carrier 130.

According to an embodiment of the present disclosure, a bottom of the first carrier 120 is provided with a protruding component 121, a top of the second carrier 130 is provided with a slot 132, and the dimensional error between the first carrier 120 and the second carrier 130 includes a dimensional difference between the protruding component 121 and the slot 132 in a width direction.

In an example, the bottom of the first carrier 120 is provided with a protruding component 121, and the top of the second carrier 130 is provided with a slot 132. Further, the top of the first carrier 120 may be provided with a slot 122, and the bottom of the second carrier 130 may be provided with a protruding component 131. That is to say, the structures of the first carrier 120 and the second carrier 130 may be the same, so that a plurality of carriers may be sequentially stacked, saving the storage space of carriers.

Optionally, in an example, the bottom of the first carrier 120 is provided with a protruding component 121, but the top of the first carrier 120 is not provided with a slot 132. Similarly, in an example, the top of the second carrier 130 is provided with a slot 132, but the bottom of the second carrier 130 is not provided with a protruding component 121. That is to say, the structures of the first carrier 120 and the second carrier 130 are not exactly the same.

In an example, for the dimensional error between the first carrier 120 and the second carrier 130, if the design width of the slot 132 is 100 mm, and the design width of the protruding component 121 is 95 mm, then their dimensional error in the width direction is 5 mm. Similarly, if a design length of the slot 132 is 100 mm, and a design length of the protruding component 121 is 95 mm, then their dimensional error in a length direction is 5 mm.

In an example, in actual handling and stacking scenarios, to ensure that the first carrier 120 can be stably stacked on the second carrier 130, a movable carrier in the present disclosure may be a carrier with a protruding component 121 at the bottom and a slot 122 at the top. When one carrier is stacked on another carrier, the protruding component of the upper carrier is firmly fixed in the slot part of the lower carrier. This setup not only restricts movement of the upper carrier in the horizontal direction but also provides a positioning reference for stacking the carrier. As shown in FIG. 3a, FIG. 3a is a schematic diagram illustrating a carrier according to an embodiment of the present disclosure. The top of the carrier is provided with a slot 122, and the bottom of the carrier is provided with a plurality of protruding components 121. Gaps between the protruding components 121 form fork holes 123 for a fork 112 of the material handling equipment 110 to extend into. A side of the protruding component 121 is a side wall of the fork hole 123. In an example, in the vertical direction, a height of the protruding component 121 may be greater than a depth of the slot 122 to facilitate the fork 112 extending into the fork hole 123 to control the movement of the first carrier 120.

In an example, the slot 122 provided at the top of the carrier may be formed by a protruding structure around the top of the carrier.

Figure 3B:
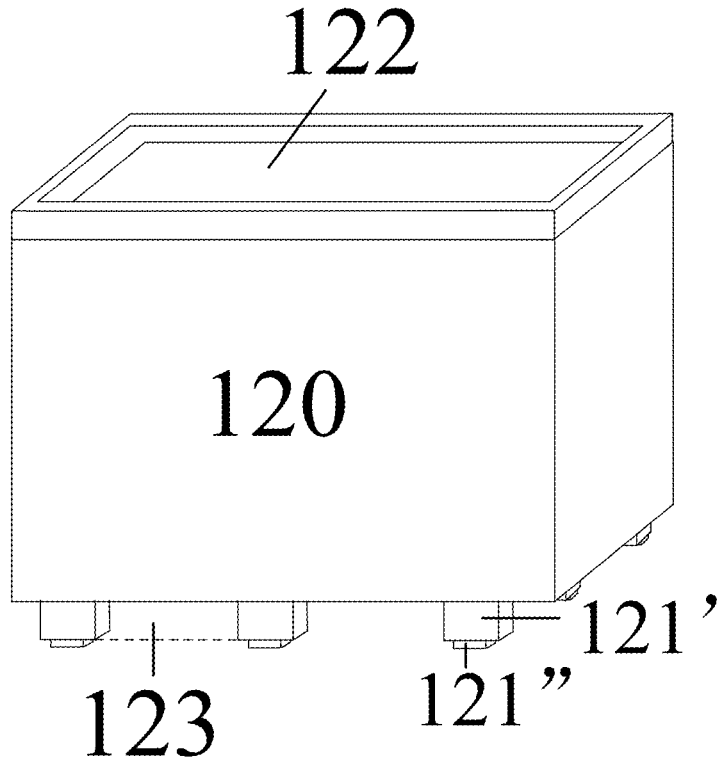
FIG. 3b is a schematic diagram of a movable carrier according to an embodiment of the present disclosure.

Optionally, in another example, as shown in FIG. 3b, the top of the carrier is provided with a slot 122, and the bottom of the carrier is provided with a plurality of first protruding components 121'. Gaps between the first protruding components 121' form fork holes 123 for a fork 112 of the material handling equipment 110 to extend into. A side of the first protruding component 121' is a side wall of the fork hole 123. A second protruding component 121" may be provided on a bottom surface of the first protruding component 121'. When one carrier is stacked on another carrier, the second protruding component 121" of the upper carrier may be inserted into the slot 122 of the lower carrier. The gaps between the plurality of first protruding components 121' form fork holes 123, and the side of the first protruding component 121' is the side wall of the fork hole 123. The fork 112 may extend into the fork hole 123 to control the movement of the first carrier 120. In an example, in the vertical direction, a projection of the second protruding component 121" may be located within a projection of the first protruding component 121', or the projection of the second protruding component 121" may coincide with the projection of the first protruding component 121'.

In other examples, the bottom of the first carrier 120 may be provided with a slot 122, the top of the second carrier 130 may be provided with a protruding component 131, and the dimensional error between the first carrier 120 and the second carrier 130 includes the dimensional difference between the protruding component 131 and the slot 122 in the width direction.

In this embodiment of the present disclosure, the stabile stacking between the first carrier 120 and the second carrier 130 is achieved through the fit between the protruding component and the slot. In addition, by setting the first offset with reference to the dimensional error between the first carrier 120 and the second carrier 130, the safety and stability of carrier stacking may be further improved.

According to an embodiment of the present disclosure, the second offset is greater than or equal to a sum of the first offset and the operational error of the material handling equipment 110.

Specifically, in an actual operation, when the material handling equipment 110 moves the first carrier 120 in the first direction based on the second offset, the impact that operational error produced when the first carrier 120 is placed in the deviation storage area may bring is usually considered. Assuming that the first carrier 120 deviates from an expected position of the deviation storage area in the first direction due to the operational error when the first carrier 120 is placed, in order to eliminate this operational error, the second offset may be greater than or equal to the sum of the first offset and the operational error. In this way, the material handling equipment 110 has a sufficient movement range to adjust the position of the first carrier 120, so that the first side of the first carrier 120 is aligned with the first side of the target storage area.

Similarly, when moving the first carrier 120 according to the second offset in the second direction, the position deviation caused by the operational error may also be coped with.

In this embodiment of the present disclosure, by setting the second offset greater than or equal to the sum of the first offset and the operational error of the material handling equipment 110, sufficient fault tolerance space is provided for the material handling equipment 110, enabling the material handling equipment 110 to move the first carrier 120 from the deviation storage area to the target storage area as accurately as possible in the presence of the operational error, and improving the success rate and accuracy of stacking the carrier.

According to an embodiment of the present disclosure, step 220 may include: controlling the first carrier to descend, during descending, adjusting an alignment error between a position of a bottom area of the first carrier and a position of a top area of the second carrier to be within a preset range; and when the alignment error between the position of the bottom area of the first carrier and the position of the top area of the second carrier is within the preset range, adjusting, according to the first offset, the position of the bottom area of the first carrier in real time, so that when the first carrier descends to a top of the second carrier, the first carrier is located at the deviation storage area.

In an example, the controller 111 of the material handling equipment 110 may be a closed-loop servo controller. In the process of controlling the first carrier 120 to descend, the material handling equipment 110 adjusts the alignment error between the position of the bottom area of the first carrier 120 and the position of the top area of the second carrier 130 through controller 111, to make the alignment error be within the preset range.

In an example, the alignment error is a difference between the position of the bottom area of the first carrier 120 and the position of the top area of the second carrier 130.

In an example, the preset range is pre-set according to the actual application scenario and the requirements for stacking precision. For example, in some warehousing scenarios with high precision requirements, the preset range may be set as an offset in the horizontal direction not exceeding 10 millimeters and a rotation angle not exceeding 1 degree.

In an example, when the alignment error exceeds the preset range, the controller 111 of the material handling equipment 110 may control the material handling equipment 110 to adjust the pose of the first carrier 120, so that the difference between the bottom area of the first carrier 120 and the top area of the second carrier 130 gradually approaches the preset range.

In an example, when the alignment error is within the preset range, the material handling equipment 110 may further operate according to the first offset. At this time, the controller 111 may monitor a descend position of the first carrier 120 in real time and adjust the position of the bottom area of the first carrier 120 in real time according to the first offset.

In an example, if the first offset is offset to the left by 3 centimeters, and the first carrier 120 has a certain offset trend in the left and right direction during the descending process, the controller 111 may predict and adjust the pose of the first carrier 120 in advance, so that the first carrier 120 may be accurately located within the deviation storage area when it falls to the top of the second carrier 130.

Figure 3C:
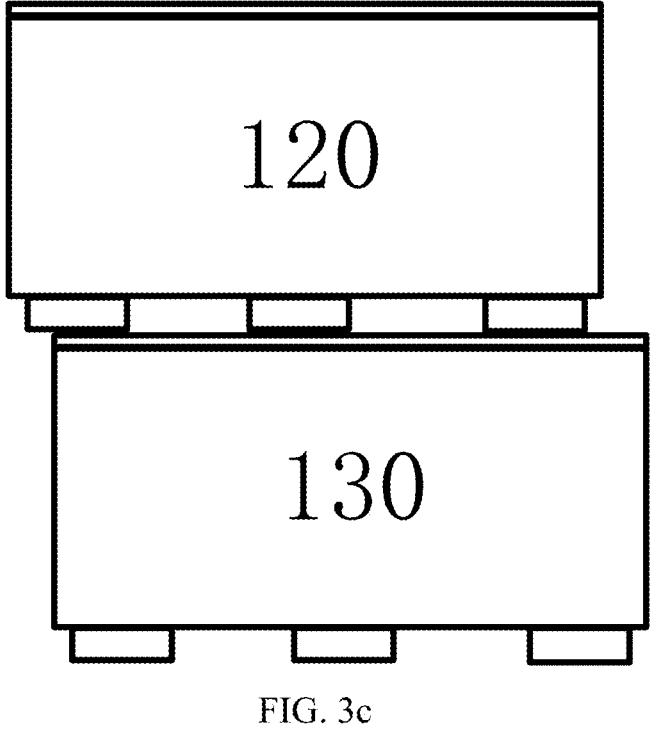
FIG. 3c is a schematic diagram of a first carrier and a second carrier according to an embodiment of the present disclosure.
Figure 3D:
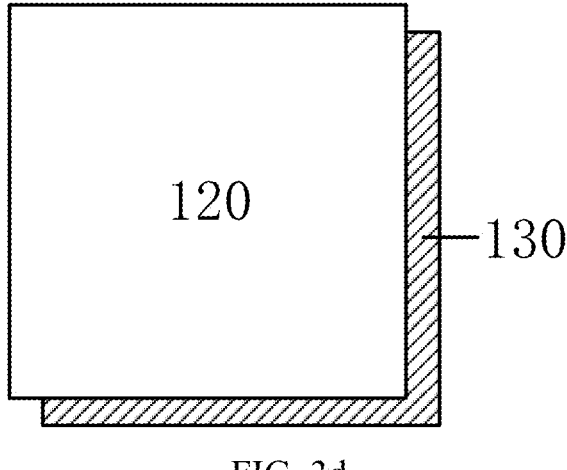
FIG. 3d is a schematic diagram of a first carrier and a second carrier according to an embodiment of the present disclosure.
Figure 3E:
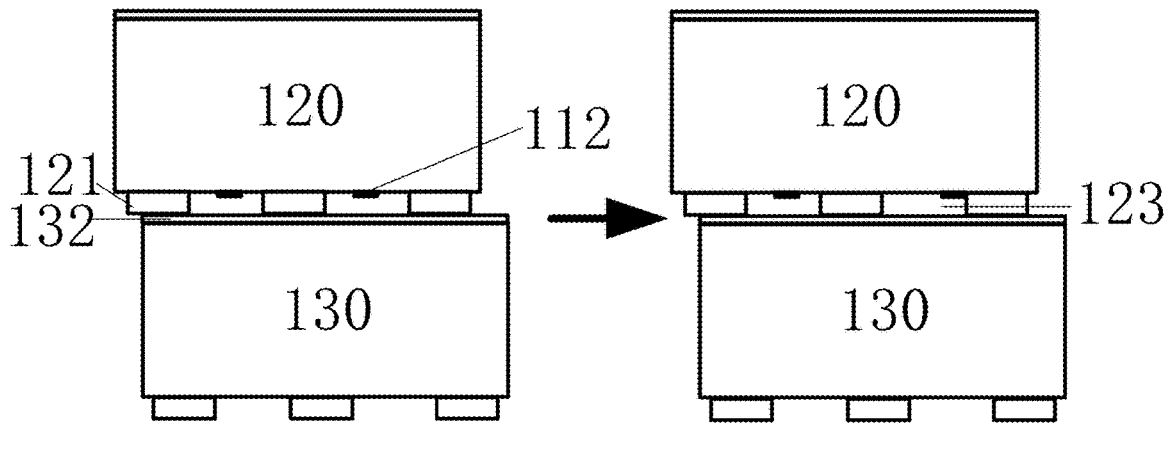
FIG. 3e is a schematic diagram illustrating the steps for adjusting a fork according to an embodiment of the present disclosure.

In an example, taking the first offset is an offset to the left by 3 centimeters and forward by 3 centimeters as an example, when placing the first carrier 120 in the deviation storage area, scene schematic diagrams in the horizontal direction and vertical direction may be shown as in FIG. 3c and FIG. 3d.

FIG. 3c is a schematic diagram illustrating a first carrier and a second carrier according to an embodiment of the present disclosure. In the figure, a carrier located above is the first carrier 120, and a carrier located below is the second carrier 130. It can be seen that in the horizontal direction, the first carrier 120 is offset by 3 cm relative to the second carrier 130.

FIG. 3d is a schematic diagram illustrating a first carrier and a second carrier according to an embodiment of the present disclosure. In the figure, the white rectangle is the first carrier 120, and the shaded rectangle is the second carrier 130. It can be seen that, whether in the front and back direction or in the left and right direction, the first carrier 120 is offset by 3 cm relative to the second carrier 130.

In an example, the upper limit of the preset range may be less than the first offset. For example, the preset range may be (−10 mm, 10 mm).

In this embodiment of the present disclosure, the closed-loop servo controller 111 may first control the alignment error within the preset range during the descending process of the first carrier 120, and then control the first carrier 120 to be located at the deviation storage area based on the first offset, thereby improving the efficiency and accuracy of placing the first carrier 120 in the deviation storage area, further ensuring the high precision when the material handling equipment 110 performs the operation of stacking the carrier.

According to an embodiment of the present disclosure, controlling the first carrier 120 to descend, during descending, adjusting the alignment error between the position of the bottom area of the first carrier 120 and the position of the top area of the second carrier 130 to be within the preset range may include: controlling the first carrier 120 to descend, during descending, collecting position data of the bottom area of the first carrier 120 and position data of the top area of the second carrier 130 through a position sensing sensor, and adjusting the alignment error between the position of the bottom area of the first carrier 120 and the position of the top area of the second carrier 130 to be within the preset range.

Specifically, a position sensing sensor may be set in the material handling equipment 110, so when the material handling equipment 110 controls the descending of the first carrier 120, the position of the bottom area of the first carrier 120 and the position of the top area of the second carrier 130 may be determined through the position sensing sensor. After that, the pose of the first carrier 120 is adjusted so that the alignment error is within the preset range.

In an example, the position sensing sensor may include at least one of sensors such as a lidar, a visual camera, or an ultrasonic sensor.

In an example, if the position sensing sensor includes a lidar, the lidar may emit a laser beam and measure the time of receiving a reflected light, thereby accurately calculating the three-dimensional coordinates of each point at the bottom of the first carrier 120 and the top of the second carrier 130, and further accurately determining the position of the bottom area of the first carrier 120 and the position of the top area of the second carrier 130.

In an example, if the position sensing sensor includes a visual camera, the visual camera may capture an image of the bottom area of the first carrier 120 and an image of the top area of the second carrier 130, and the contours, edges, and feature points of the bottom area of the first carrier 120 and the top area of the second carrier 130 may be identified by using an image processing algorithm, thereby determining the position of the bottom area of the first carrier 120 and the position of the top area of the second carrier 130.

In an example, the alignment error may include a difference between the bottom area of the first carrier 120 and the top area of the second carrier 130 in the left and right direction, and/or a difference between the bottom area of the first carrier 120 and the top area of the second carrier 130 in the front and back direction. Here, the left and right direction may include the first direction, and the front and back direction may include the second direction.

In an example, during the process of adjusting the pose of the first carrier 120, the controller 111 may continuously obtain the latest position data from the position sensing sensor and monitor the changes of the alignment error in real time. If the alignment error is still large, the controller 111 may continue to adjust the pose of the first carrier 120 until the alignment error is within the preset range.

In this embodiment of the present disclosure, by collecting position data through the position sensing sensor in real-time and adjusting the position of the first carrier 120 according to the alignment error in real-time, it can ensure a position alignment precision between the first carrier 120 and the second carrier 130 during the descending process, improving the reliability and efficiency of the stacking process.

According to an embodiment of the present disclosure, step 230 further includes: in a case that the detection result indicates that the first carrier is not moved to the target storage area, controlling the first carrier to move to a preset position, and re-executing the step of placing the first carrier in the deviation storage area.

In an example, when the detection result shows that the first carrier 120 has not been moved to the target storage area, it means that the current moving operation fails to successfully stack the first carrier 120 on the second carrier 130. At this time, the controller 111 of the material handling equipment 110 may quickly respond and control the first carrier 120 to move to the preset position according to a pre-set strategy.

In an example, the preset position is usually a relatively safe and convenient position for reoperation, such as a position at a certain distance (e.g., 1 meter) from the target storage area in the vertical direction and without interference from the other obstacle.

In an example, the material handling equipment 110 may, based on the position sensing sensor installed on itself, obtain the position data of the first carrier 120 in real time and plan a safe movement path to move the first carrier 120 to the preset position. During the movement, the material handling equipment 110 may travel at an appropriate speed while monitoring the surrounding environment to avoid collisions with other equipment or goods.

In an example, when the first carrier 120 reaches the preset position, the material handling equipment 110 may readjust the posture of the first carrier 120 to ensure it is in a suitable placement state. Afterwards, the material handling equipment 110 may re-execute the step of placing the first carrier 120 in the deviation storage area. In an example, the placement state may be a state when the alignment error between the bottom area of the first carrier 120 and the top area of the second carrier 130 is within the preset range.

In this embodiment of the present disclosure, if the first carrier 120 fails to successfully move to the target storage area, the first carrier 120 may be controlled to move to the preset position. Through this fallback mechanism, the position of the first carrier 120 may be adjusted in time in a case of stacking failure, and a stacking process may be re-executed, improving the success rate of stacking the carrier and enhancing the stability and reliability of the entire material handling system.

According to an embodiment of the present disclosure, a shape of the deviation storage area is the same as a shape of the target storage area, and a difference between the deviation storage area and the target storage area in the target direction is the first offset.

In this embodiment of the present disclosure, the shape of the deviation storage area is the same as the shape of the target storage area, and there is a difference of a first offset between the deviation storage area and the target storage area in the target direction. For example, the difference between the deviation storage area and the target storage area in the first direction is the first offset, and/or the difference between the deviation storage area and the target storage area in the second direction is the first offset. In this way, the complexity of operation of the material handling equipment 110 may be reduced, and the accuracy and stability of stacking operation may be improved.

According to an embodiment of the present disclosure, a bottom of the first carrier 120 is provided with a protruding component 121, and a top of the second carrier 130 is provided with a slot 132. Step 230 may include: moving the first carrier 120 according to the target direction to engage the protruding component 121 of the first carrier 120 with the slot 132 of the second carrier 130 to move the first carrier 120 from the deviation storage area to the target storage area.

Specifically, the bottom of the first carrier 120 is provided with a protruding component 121, and the top of the second carrier 130 is provided with a slot 132. When the first carrier 120 moves to the target storage area, the protruding component 121 at the bottom of the first carrier 120 is engaged with the slot 132 at the top of the second carrier 130, firmly securing the first carrier 120 on the top of the second carrier 130, and successfully stacking the first carrier 120 on the second carrier 130.

In an example, the material handling equipment 110 may control the movement of the first carrier 120 based on the preset target direction. During a movement process, the position and posture of the first carrier 120 may be determined in real time through the relative position relationship between the protruding component 121 and the slot 132.

In an example, an opening part of the slot 132 usually has a certain chamfer or slope to facilitate easier entry of the protruding component 121 into the slot. At the same time, an internal size of the slot 132 may match the size of the protruding component 121, ensuring a tight fit between the two, thereby achieving stable stacking.

In an example, when the protruding component 121 is fully inserted into the slot 132, the material handling equipment 110 may reconfirm whether the position and posture of the first carrier 120 meet the requirements. If it is detected that the first carrier 120 is accurately positioned in the target storage area and the fit between the protruding component 121 and the slot 132 is tight, the material handling equipment 110 may stop moving and determine that the stacking of the first carrier 120 is successful. Conversely, if a deviation between the pose of the first carrier 120 and the pose of the second carrier 130 is detected, or if the fit between the protruding component 121 and the slot 132 is not ideal, the material handling equipment 110 may adjust the pose of the first carrier 120 according to the specific situation, such as re-moving the first carrier 120, attempting again to engage the protruding component 121 with the slot 132, or issuing an alert to prompt an operator to intervene.

In an example, when the protruding component 121 is engaged with the slot 132, the center of gravity of the first carrier 120 may sink, and a collision usually occurs between the first carrier 120 and the second carrier 130. Therefore, the material handling equipment 110 may also collect a sound signal during the movement process and determine the detection result of the sound signal to judge whether the first carrier 120 has been moved to the target storage area, that is, whether the protruding component 121 is engaged with the slot 132.

In this embodiment of the present disclosure, by engaging the protruding component of the first carrier 120 with the slot of the second carrier 130, the precise movement of the first carrier 120 from the deviation storage area to the target storage area is achieved, thereby realizing the reliable stacking of the first carrier 120 and the second carrier 130.

According to an embodiment of the present disclosure, a bottom of the first carrier 120 is provided with a plurality of fork holes 123, and the material handling equipment 110 includes a plurality of forks 112. Before moving the first carrier 120 according to the target direction to move the first carrier 120 from the deviation storage area to the target storage area, the material handling equipment 110 is further configured to perform a following step: moving at least one fork 112 in the plurality of forks 112, so that the at least one fork 112 contacts a side wall of at least one fork hole 123 corresponding to the at least one fork 112, respectively.

Specifically, taking the material handling equipment 110 as an automated guided forklift as an example, the fork 112 is a key execution component for moving the first carrier 120 to achieve the pose adjustment of the first carrier 120. In this case, after placing the first carrier 120 in the deviation storage area, the material handling equipment 110 may control the first carrier 120 to move in the left and right direction and the front and back direction through its own fork 112.

In an example, the bottom of the first carrier 120 is provided with a plurality of fork holes 123, and the material handling equipment 110 includes a plurality of forks 112, the plurality of forks 112 may extend into the plurality of fork holes 123. The number of fork holes 123 may be greater than or equal to the number of forks 112. In an example, each fork 112 may be located in one of the plurality of fork holes 123. When the fork 112 comes into contact with a top wall of the fork hole 123 (a bottom surface of the first carrier 120), the fork may carry the first carrier 120 to move.

In an example, if the first direction is a direction to the right, the material handling equipment 110 may move at least one fork 112 among the plurality of forks 112 of its own, so that the at least one fork 112 comes into contact with a right side wall of the corresponding fork hole 123, thereby driving the first carrier 120 to move to the right. Similarly, if the first direction is a direction to the left, the material handling equipment 110 may control at least one fork 112 to come into contact with a left side wall of the corresponding fork hole 123, thereby driving the first carrier 120 to move to the left.

FIG. 3*e* is a schematic diagram illustrating the steps for adjusting a fork according to an embodiment of the present disclosure. As shown in FIG. 3*e*, a carrier located above is the first carrier 120, a carrier located below is the second carrier 130, and the black rectangle between the protruding components 121 at the bottom of the first carrier 120 is the fork 112 of the material handling equipment 110. It can be seen that the material handling equipment 110 may control an fork 112 to move the fork to the side wall of the corresponding fork hole 123. In the figure, the first carrier 120 is offset to the left relative to the second carrier 130 by the first offset, so the first direction in which the material handling equipment 110 moves the first carrier 120 may be to the right. Therefore, the material handling equipment 110 may control the fork 112 to move to a right side wall of the fork hole corresponding to the fork 112.

In an example, a pressure sensor may be provided on the fork 112. When a value of the pressure sensor is higher than a preset pressure threshold, the material handling equipment 110 may determine that the fork 112 has come into contact with the side wall of the corresponding fork hole 123.

In an example, the material handling equipment 110 may control the first carrier 120 to move according to the first direction by at least one fork 112 applying force to the side wall of the fork hole 123 corresponding to at least one fork 112. At the same time, the close contact between the fork 112 and the side wall of the fork hole 123 corresponding to the fork 112 may prevent the first carrier 120 from sliding or shaking relative to the fork during the movement process, ensuring the stability of the carrier.

In an example, the fork 112 may be controlled to move a first distance according to the first direction, so that the fork 112 and the side wall of the corresponding fork hole 123 are in close contact. For example, a distance between the fork 112 and the side wall of the fork hole 123 corresponding to the fork may be obtained through a position sensing sensor and used as the first distance.

In an example, the fork 112 may be controlled to move according to the first direction until the fork 112 comes into contact with the side wall of the corresponding fork hole 123.

In this embodiment of the present disclosure, the material handling equipment 110 may ensure that at least one fork 112 comes into contact with the side wall of the corresponding fork hole 123 through reasonable control of fork movement and accurate contact judgment, improving the stability during the movement process of the first carrier 120.

According to an embodiment of the present disclosure, the at least one fork 112 includes two forks 112, and the material handling equipment 110 is further configured to perform a following step: adjusting a distance between the two forks 112 according to a preset distance. Moving at least one fork 112 in the plurality of forks 112, so that the at least one fork 112 contacts the side wall of the at least one fork hole 123 corresponding to the at least one fork 112, respectively, includes: moving the two forks 112, so that the two forks 112 contact side walls of fork holes 123 corresponding to the two forks 112, respectively.

In an example, when the material handling equipment 110 includes two forks 112, the material handling equipment 110 may also adjust the distance between the two forks 112 according to a preset distance and move the two forks 112, so that the two forks 112 come into contact with the side walls of fork holes 123 corresponding to the two forks 112, respectively.

Figure 3F:
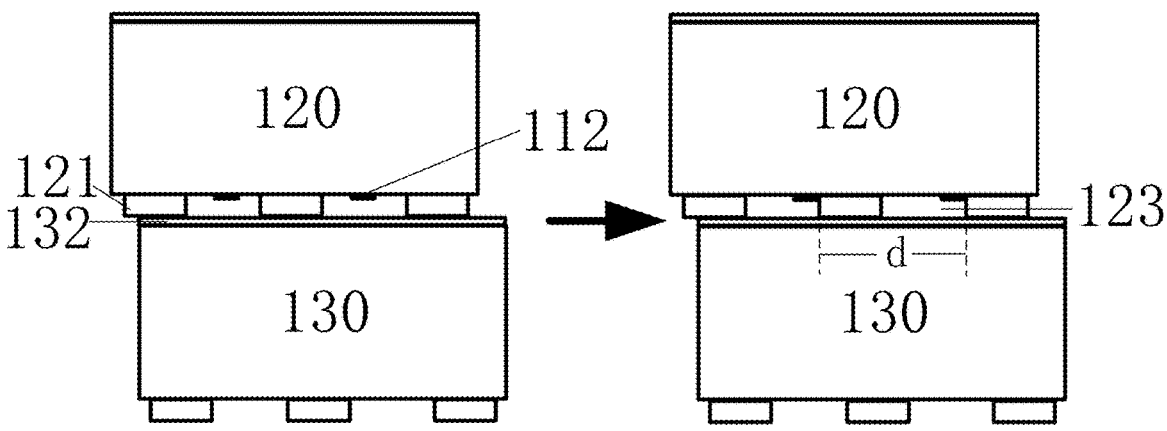
FIG. 3f is a schematic diagram illustrating the steps for adjusting a fork according to an embodiment of the present disclosure.

FIG. 3*f* is a schematic diagram illustrating the steps for adjusting a fork according to an embodiment of the present disclosure. As shown in FIG. 3*f*, a carrier located above is the first carrier 120, a carrier located below is the second carrier 130, and the black rectangle between the protruding components 121 at the bottom of the first carrier 120 is the fork 112 of the material handling equipment 110. It can be seen that the material handling equipment 110 may control the two forks 112 to move the two forks 112 to the side walls of the fork holes 123 corresponding to the two forks 112, respectively. In the figure, the first carrier 120 is offset to the left relative to the second carrier 130 by the first offset, so when the material handling equipment 110 moves the first carrier 120, the first direction may be to the right. Therefore, the material handling equipment 110 may control the two forks 112 to move to the right side walls of the fork holes 123 corresponding to the two forks 112, respectively. Here, the preset distance may be a distance between the right side walls of the fork holes 123 of the two forks 112 (as shown by the length d in the figure).

In an example, the preset distance is a distance between the side walls of the two fork holes 123 in the same direction.

In this embodiment of the present disclosure, allowing two forks to come into contact with side walls of the corresponding fork holes, compared to a single fork pushing the carrier, may provide more stable support and driving force for the first carrier 120. When the two forks 112 act simultaneously, the forces they exert on the first carrier 120 are more balanced, effectively preventing the carrier from tilting or shaking during a movement process. When moving the first carrier 120, the two forks exert forces on the carrier from different positions, thereby making the carrier subject to uniform force and move more smoothly according to the target direction. For example, during a process of moving the first carrier 120 from the deviation storage area to the target storage area, the coordinated action of the two forks may ensure that a movement path of the carrier is straighter, improving the accuracy of the movement.

In an example, the above description takes the material handling equipment 110 moving the first carrier 120 to cause the protruding component 121 of the first carrier 120 to engage with the slot 132 of the second carrier 130 as an example, so when describing the protruding component, 121 is used as a reference, and when describing the slot, 132 is used as a reference.

In an example, the first direction may be a rightward direction or a leftward direction, and the second direction may be a forward direction or a backward direction. When the first side of the first carrier 120 is aligned with the first side of the target storage area along the first direction, the center of gravity of the first carrier 120 may shift downward.

At this time, the first carrier 120 and the fork 112 of the material handling equipment 110 come into contact, and a static friction between the first carrier 120 and the fork 112 is greater than a kinetic friction between the first carrier 120 and the second carrier 130. Therefore, by virtue of the static friction between the first carrier 120 and the fork 112, the material handling equipment 110 may control the first carrier 120 to complete the movement in the second direction. Alternatively, when the second direction is a backward direction, the body of the material handling equipment 110 may push the first carrier 120 backward while moving the first carrier 120 along the backward direction.

In an example, the first direction may be a forward direction or a backward direction, and the second direction may be a rightward direction or a leftward direction. For example, the first carrier 120 is offset forward relative to the second carrier 130 by the first offset, so the material handling equipment 110 may use the body of the material handling equipment 110 to push the first carrier 120 backward, thereby completing the movement of the first carrier 120 in the first direction. Alternatively, similar to the previous example, the material handling equipment 110 may control the first carrier 120 to complete the movement in the first direction (forward direction or backward direction) by virtue of the static friction between the first carrier 120 and the fork 112. After the first side of the first carrier 120 is aligned with the first side of the target storage area, the fork 112 may be adjusted to come into contact with the side wall of the fork hole, thereby completing the movement of the first carrier 120 in the second direction.

It should be understood that, generally, a direction of the body of the material handling equipment 110 (such as a forklift) facing the fork 112 is regarded as a backward direction, while a direction of the body of the material handling equipment 110 facing away from the fork 112 is regarded as a forward direction. Generally, a mast of the material handling equipment 110 is used to push the carrier to move backward.

According to an embodiment of the present disclosure, detecting the sound signal to obtain the detection result may include: inputting the sound signal into a sound detection model to obtain the detection result output by the sound detection model.

In this embodiment of the present disclosure, by inputting the sound signal into the sound detection model to obtain the detection result, an accurate and real-time carrier alignment detection method is provided for the material handling equipment 110, effectively improving the automation and accuracy of handling and stacking operations.

FIG. 4 is a schematic flowchart illustrating a method for stacking according to another exemplary embodiment of the present disclosure. The embodiment in FIG. 4 is an example of the embodiment in FIG. 2. To avoid repetition, the same parts may refer to the descriptions in the above embodiments, which are not be repeated here. As shown in FIG. 4, the method for stacking may include the following contents.

410: determining a first carrier and a target storage area of the first carrier, where the target storage area is a top area of the second carrier.

In an example, if the first carrier 120 is stored at a preset pickup location, then the material handling equipment 110 may move to the pickup location and pick up the first carrier 120 from the pickup location. Further, the material handling equipment 110 may determine the position of the second carrier 130 on which the first carrier 120 needs be stacked, and use the top area of the second carrier 130 as the target storage area of the first carrier 120.

420: determining a deviation storage area based on a first offset and the target storage area, and placing the first carrier in the deviation storage area.

430: based on a second offset, moving the first carrier according to a first direction, and collecting a first sound signal during a first movement process corresponding to the first direction.

440: detecting the first sound signal to obtain a first detection result, where the first detection result is configured to indicate whether a first side of the first carrier is aligned with a first side of the target storage area.

450: determining whether the first detection result indicates that the first side of the first carrier is aligned with the first side of the target storage area. If yes, step 470 may be executed; if no, step 460 may be executed.

460: controlling the first carrier to move to a preset position.

470: based on the second offset, moving the first carrier according to a second direction, and collecting a second sound signal during a second movement process corresponding to the second direction.

480: detecting the second sound signal to obtain a second detection result, where the second detection result is configured to indicates whether a second side of the first carrier is aligned with a second side of the target storage area.

490: determining whether the second detection result indicates that the second side of the first carrier is aligned with the second side of the target storage area. If yes, it indicates that the first carrier has been moved to the target storage area, and the stacking process may be ended; if no, step 460 may be executed.

After the first carrier 120 moves to the preset position, the material handling equipment 110 may repeat step 430 or repeat the step of placing the first carrier 120 in the deviation storage area in step 420.

Optionally, in step 490, if the second side of the first carrier is not aligned with the second side of the target storage area, the first carrier 120 may be controlled to move a certain distance in an opposite direction of the second direction, and then repeat the step of moving the first carrier according to the second direction and collecting the second sound signal during the second movement process corresponding to the second direction, until the second detection result indicates that the second side of the first carrier is aligned with the second side of the target storage area.

The contents of the material handling equipment 110, the first carrier 120, the second carrier 130, the first offset, the second offset, the first movement process, the second movement process, the first sound signal, the second sound signal, the first detection result, and the second detection result may be specifically referred to the relevant descriptions in the above embodiments, and are not repeated here in the present disclosure.

In this embodiment, a two-stage operation method is adopted to stack the first carrier 120 on the second carrier 130. In the first stage, the first carrier 120 is placed on the deviation storage area, and in the second stage, the first carrier 120 is moved according to the first direction and the second direction respectively, so that the first carrier 120 is moved to the target storage area. This two-stage operation method may overcome the influence of an operational error on the stacking process to some extent, improving the accuracy rate of stacking of the carrier, that is, increasing an alignment degree of the carrier.

It should be understood that the execution order of a plurality of steps in the above may be adjusted according to actual needs.

Exemplary Apparatus

The embodiments of the present disclosure also provide a material handling equipment, see FIG. 1, the material handling equipment 110 includes a controller 111, and the controller 111 is configured to execute the method for stacking provided in any of the above embodiments, such as the method for stacking provided in the embodiment of FIG. 2 or FIG. 4.

The specific functions and effects of the material handling equipment according to the embodiments of the present disclosure may be referred to the descriptions of the above method embodiments, and to avoid repetition, they are not repeated here.

The embodiments of the present disclosure also provide a controller, such as the controller 111 in FIG. 1, which includes a processor and a memory configured to store an instruction executable by the processor, where the processor is configured to execute the method for stacking provided in any of the above embodiments, such as the method for stacking provided in the embodiment of FIG. 2 or FIG. 4.

Figure 5:
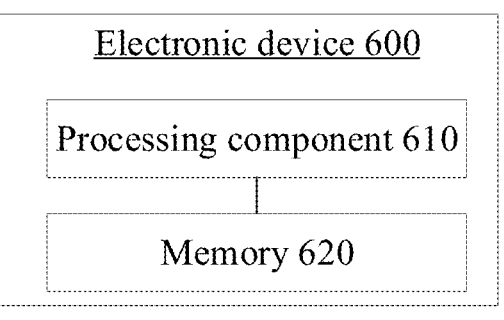
FIG. 5 is a block diagram of an electronic device for executing a method for stacking according to an exemplary embodiment of the present disclosure.

FIG. 5 is a block diagram of an electronic device 600 for executing a method for stacking according to an exemplary embodiment of the present disclosure. The electronic device 600 may specifically be an automated guided forklift, an AGV, a robot, etc.

Referring to FIG. 5, the electronic device 600 includes a processing component 610 further including one or more processors, and a memory resource represented by a memory 620 for storing instructions executable by the processing component 610, such as an application program. The application program stored in the memory 620 may include one or more modules each corresponding to a set of instructions. In addition, the processing component 610 is configured to execute instructions to perform the above method for stacking. For example, the electronic device 600 includes a controller, and the controller includes: a processor; and a memory configured to store an instruction executable by the processor, where the processor is configured to execute the above method for stacking. Specifically, the controller may be the controller of the material handling equipment.

The electronic device 600 may also include: a power supply component configured to perform power management of the electronic device 600; a wired or wireless network interface configured to connect the electronic device 600 to a network; and an input/output (I/O) interface. The electronic device 600 may be operated based on an operating system stored in the memory 620, such as Windows Server™, Mac OS X™, Unix™, Linux™, FreeBSD™, or similar.

A non-transitory computer-readable storage medium is provided, and when instructions in the storage medium are executed by the processor of the above electronic device 600, the above electronic device 600 can execute a method for stacking.

A computer program product is further provided, the computer program product includes a computer program, and when the computer program is executed by a processor of a computer device, the computer device is enabled to execute the method for stacking provided in any of the above embodiments.

All the above optional technical solutions may be combined in any way to form the optional embodiments of the present disclosure, and details are not repeated here.

Those of ordinary skill in the art may realize that units and algorithm steps in examples described in combination with the embodiments disclosed in this specification may be implemented by electronic hardware or a combination of computer software and electronic hardware. Whether these functions are implemented in hardware or software depends on a specific application and design constraints of the technical solution. Professional technicians may use different methods to implement the described functions for each specific application, but such implementation should not be considered beyond the scope of the present disclosure.

Those skilled in the art may clearly understand that for the convenience and conciseness of the description, the specific working processes of the systems, apparatuses, and units described above may refer to the corresponding processes in the aforementioned method embodiments, and details are not repeated here.

In the several embodiments according to the present disclosure, it should be understood that the disclosed systems, apparatuses, and methods may be implemented in other ways. For example, the apparatus embodiments described above are merely illustrative. For example, the division of units is only a logical function division, and there may be other division methods in actual implementation. For example, a plurality of units or components may be combined or integrated into another system, or some features may be ignored or not implemented. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, functional units in various embodiments of the present disclosure may be integrated into one processing unit, or each unit may exist physically alone, or two or more units may be integrated into one unit.

If the functions are implemented in a form of a software functional unit and sold or used as an independent product, the functions may be stored in a computer-readable storage medium. Based on this understanding, the technical solutions of the present disclosure, or the part that contributes to the prior art, or part of the technical solutions, may be embodied in a form of a software product. The computer software product is stored in a storage medium and includes several instructions to make a computer device (such as a personal computer, a server, or a network device) perform all or part of the steps of the methods described in the various embodiments of the present disclosure. The aforementioned storage medium includes: various media that may store program check codes, such as a USB flash disk, a mobile hard disk, a Read-Only Memory (ROM), a Random Access Memory (RAM), a magnetic disk, or an optical disk.

It should be noted that in the description of the present disclosure, the terms "first", "second", "third", and the like are merely intended for a purpose of description, and shall not be understood as an indication or implication of relative importance. In addition, in the descriptions of the present disclosure, unless otherwise stated, "a plurality of" means at least two.

The foregoing descriptions are merely preferable embodiments of the present disclosure, but are not intended to limit the present disclosure. Any modification, equivalent replacement, and the like made without departing from the spirit and principle of the present disclosure shall fall within the protection scope of the present disclosure.

What is claimed is:

1. A material handling equipment, comprising a controller, wherein the controller is configured to execute program instructions to perform following steps:

determining a first carrier and a target storage area of the first carrier, wherein the target storage area is a top area of a second carrier;

determining a deviation storage area based on a first offset and the target storage area, and placing the first carrier in the deviation storage area, wherein the first offset is greater than or equal to an operational error of the material handling equipment, and when the first carrier is placed in the deviation storage area, the first carrier and the second carrier are in contact with each other; and moving the first carrier according to a target direction to move the first carrier from the deviation storage area to the target storage area, wherein a bottom of the first carrier is provided with a protruding component, and a top of the second carrier is provided with a slot, wherein moving the first carrier according to the target direction to move the first carrier from the deviation storage area to the target storage area comprises:

moving the first carrier according to the target direction to engage the protruding component of the first carrier with the slot of the second carrier to move the first carrier from the deviation storage area to the target storage area.

2. The material handling equipment according to claim 1, wherein moving the first carrier according to the target direction to move the first carrier from the deviation storage area to the target storage area comprises:

moving the first carrier according to the target direction, and collecting a sound signal during a movement process of the first carrier; and detecting the sound signal to obtain a detection result, wherein the detection result is configured to indicate whether the first carrier is moved to the target storage area.

3. The material handling equipment according to claim 1, wherein moving the first carrier according to the target direction to move the first carrier from the deviation storage area to the target storage area comprises:

moving the first carrier according to the target direction based on a second offset to move the first carrier from the deviation storage area to the target storage area, wherein the second offset is greater than the first offset.

4. The material handling equipment according to claim 1, wherein the target direction comprises a first direction and a second direction, wherein moving the first carrier according to the target direction to move the first carrier from the deviation storage area to the target storage area comprises:

moving the first carrier according to the first direction to align a first side of the first carrier with a first side of the target storage area; and moving the first carrier according to the second direction to align a second side of the first carrier with a second side of the target storage area.

5. The material handling equipment according to claim 4, wherein moving the first carrier according to the first direction to align the first side of the first carrier with the first side of the target storage area comprises:

moving the first carrier according to the first direction, and collecting a first sound signal during a first movement process corresponding to the first direction; and detecting the first sound signal to obtain a first detection result, wherein the first detection result is configured to indicate whether the first side of the first carrier is aligned with the first side of the target storage area, wherein moving the first carrier according to the second direction to align the second side of the first carrier with the second side of the target storage area comprises:

moving the first carrier according to the second direction, and collecting a second sound signal during a second movement process corresponding to the second direction; and detecting the second sound signal to obtain a second detection result, wherein the second detection result is configured to indicate whether the second side of the first carrier is aligned with the second side of the target storage area.

6. The material handling equipment according to claim 5, wherein moving the first carrier according to the first direction, and collecting the first sound signal during the first movement process corresponding to the first direction comprises:

moving the first carrier according to the first direction based on a second offset, and collecting the first sound signal during the first movement process corresponding to the first direction, wherein the second offset is greater than the first offset, wherein moving the first carrier according to the second direction, and collecting the second sound signal during the second movement process corresponding to the second direction comprises:

moving the first carrier according to the second direction based on the second offset, and collecting the second sound signal during the second movement process corresponding to the second direction.

7. The material handling equipment according to claim 4, wherein the first direction is perpendicular to the second direction.

8. The material handling equipment according to claim 1, wherein the first offset is greater than or equal to a sum of the operational error of the material handling equipment and a dimensional error between the first carrier and the second carrier.

9. The material handling equipment according to claim 8, wherein the dimensional error between the first carrier and the second carrier comprises a dimensional difference between the protruding component and the slot in a width direction.

10. The material handling equipment according to claim 3, wherein the second offset is greater than or equal to a sum of the first offset and the operational error of the material handling equipment.

11. The material handling equipment according to claim 1, wherein placing the first carrier in the deviation storage area comprises:

controlling the first carrier to descend, during descending, adjusting an alignment error between a position of a bottom area of the first carrier and a position of a top area of the second carrier to be within a preset range; and when the alignment error between the position of the bottom area of the first carrier and the position of the top area of the second carrier is within the preset range, adjusting, according to the first offset, the position of the bottom area of the first carrier in real time, so that when the first carrier descends to a top of the second carrier, the first carrier is located at the deviation storage area.

12. The material handling equipment according to claim 11, wherein controlling the first carrier to descend, during descending, adjusting the alignment error between the position of the bottom area of the first carrier and the position of the top area of the second carrier to be within the preset range comprises:

controlling the first carrier to descend, during descending, collecting position data of the bottom area of the first carrier and position data of the top area of the second carrier through a position sensing sensor, and adjusting the alignment error between the position of the bottom area of the first carrier and the position of the top area of the second carrier to be within the preset range.

13. The material handling equipment according to claim 2, wherein moving the first carrier according to the target direction to move the first carrier from the deviation storage area to the target storage area further comprises:

in a case that the detection result indicates that the first carrier is not moved to the target storage area, controlling the first carrier to move to a preset position, and re-executing the step of placing the first carrier in the deviation storage area.

14. The material handling equipment according to claim 1, wherein a shape of the deviation storage area is the same as a shape of the target storage area, and a difference between the deviation storage area and the target storage area in the target direction is the first offset.

15. The material handling equipment according to claim 1, wherein a bottom of the first carrier is provided with a plurality of fork holes, and the material handling equipment further comprises a plurality of forks, wherein before moving the first carrier according to the target direction to move the first carrier from the deviation storage area to the target storage area, the material handling equipment is further configured to perform a following step:

moving at least one fork in the plurality of forks, so that the at least one fork contacts a side wall of at least one fork hole corresponding to the at least one fork, respectively.

16. The material handling equipment according to claim 15, wherein the at least one fork comprises two forks, and the material handling equipment is further configured to perform a following step:

adjusting a distance between the two forks according to a preset distance, wherein moving at least one fork in the plurality of forks, so that the at least one fork contacts the side wall of the at least one fork hole corresponding to the at least one fork, respectively, comprises:

moving the two forks, so that the two forks contact side walls of fork holes corresponding to the two forks, respectively.

17. The material handling equipment according to claim 2, wherein detecting the sound signal to obtain the detection result comprises:

inputting the sound signal into a sound detection model to obtain the detection result output by the sound detection model.

18. A method for stacking, comprising:

determining a first carrier and a target storage area of the first carrier, wherein the target storage area is a top area of a second carrier;

determining a deviation storage area based on a first offset and the target storage area, and placing the first carrier in the deviation storage area, wherein the first offset is greater than or equal to an operational error of a material handling equipment, and when the first carrier is placed in the deviation storage area, the first carrier and the second carrier are in contact with each other; and moving the first carrier according to a target direction to move the first carrier from the deviation storage area to the target storage area, wherein a bottom of the first carrier is provided with a protruding component, and a top of the second carrier is provided with a slot, wherein moving the first carrier according to the target direction to move the first carrier from the deviation storage area to the target storage area comprises:

moving the first carrier according to the target direction to engage the protruding component of the first carrier with the slot of the second carrier to move the first carrier from the deviation storage area to the target storage area.

19. A controller, comprising:

a processor; and a memory configured to store an instruction executable by the processor, wherein the processor is configured to execute a method for stacking, and the method for stacking comprises:

determining a first carrier and a target storage area of the first carrier, wherein the target storage area is a top area of a second carrier;

determining a deviation storage area based on a first offset and the target storage area, and placing the first carrier in the deviation storage area, wherein the first offset is greater than or equal to an operational error of a material handling equipment, and when the first carrier is placed in the deviation storage area, the first carrier and the second carrier are in contact with each other; and moving the first carrier according to a target direction to move the first carrier from the deviation storage area to the target storage area, wherein a bottom of the first carrier is provided with a protruding component, and a top of the second carrier is provided with a slot, wherein moving the first carrier according to the target direction to move the first carrier from the deviation storage area to the target storage area comprises:

moving the first carrier according to the target direction to engage the protruding component of the first carrier with the slot of the second carrier to move the first carrier from the deviation storage area to the target storage area.

* * * * *